United States Patent
Bouhelal

(10) Patent No.: US 6,987,149 B2
(45) Date of Patent: Jan. 17, 2006

(54) ISOSTATIC POLYPROPYLENE CROSSLINKING IN THE PRESENCE OF PEROXIDE

(76) Inventor: Said Bouhelal, c/o Bush, Lewis and Roebuck, Beaumont, TX (US) 77701-3612

( * ) Notice: Subject to any disclaimer, the term of this patent is extended or adjusted under 35 U.S.C. 154(b) by 57 days.

(21) Appl. No.: 10/473,351

(22) PCT Filed: Apr. 22, 2002

(86) PCT No.: PCT/DZ02/00001

§ 371 (c)(1),
(2), (4) Date: Sep. 30, 2003

(87) PCT Pub. No.: WO02/085973

PCT Pub. Date: Oct. 31, 2002

(65) Prior Publication Data
US 2005/0020782 A1    Jan. 27, 2005

(30) Foreign Application Priority Data
Apr. 22, 2001 (DZ) ..................................... 010025

(51) Int. Cl.
*C08C 19/20* (2006.01)
*C08F 8/34* (2006.01)
(52) U.S. Cl. ....................... 525/345; 525/354; 525/343
(58) Field of Classification Search ................ 525/345, 525/354, 343
See application file for complete search history.

(56) References Cited

U.S. PATENT DOCUMENTS

| 3,012,016 A | * | 12/1961 | Kirk, Jr. et al. ......... 525/333.8 |
| 3,143,584 A | | 8/1964 | Roberts et al. |
| 3,256,366 A | | 6/1966 | Corbelli |
| 3,258,447 A | | 6/1966 | Matteucci et al. |
| 3,336,254 A | | 8/1967 | White |
| 3,575,920 A | | 4/1971 | Ballini et al. |
| 4,104,210 A | * | 8/1978 | Coran et al. ................. 525/232 |

FOREIGN PATENT DOCUMENTS

| GB | 989372 | | 5/1961 |
| GB | 989372 | * | 4/1965 |

* cited by examiner

Primary Examiner—Ling-Sui Choi
(74) Attorney, Agent, or Firm—Buskop Law Group, P.C.; Wendy Buskop

(57) ABSTRACT

This invention concerns the crosslinking of isotactic polypropylene, which has always been considered a non-crosslinkable polymer. Isotactic polypropylene crosslinking not only generates new uses but also the prospects of both economic and environmentally friendly mixing and recovery operations with other polymers. The crosslinking and interpenetrating polymer network (IPN) (as is the case with polypropylene/polyethylene mixture) provides both interesting properties and significant economic and environmentally friendly interest. The principle of the crosslinking mechanism is to create macro radicals and cause them to act immediately on sulphur before the reaction of peroxide termination. The mixing process used is extrusion; however, all other processes of transformation used for thermoplastics would be useful for subsequent industrial use.

13 Claims, No Drawings

ISOSTATIC POLYPROPYLENE CROSSLINKING IN THE PRESENCE OF PEROXIDE

The invention concerns the crosslinking of isotactic polypropylene—both the homopolymer and modified polymer. The crosslinking reaction provides the polypropylene with new morphological structures. The crosslinking agent is a chemical product consisting of peroxide and sulphur, in addition to accelerators for sulphur.

The crosslinking process is fully chemical and the reaction is homolytic. The crosslinking agent must react at temperatures corresponding to polypropylene transformation and mixing temperatures. The couple used for the crosslinking reaction links the macro molecular chains of the polypropylene by bridges mainly made of sulphur. The bridges can be: a sulphur atom S1, a polysulphide Sx or a sulphur cyclic compound. First, the initiation reaction caused by the peroxide radical creates macro radicals; then, the reaction of propagation with sulphur occurs, which creates covalent bonds. This should take place before the quick stop of these macro radicals because they have a very short lifetime; the peroxide radical ensures the macro radical formation, while the sulphur causes the reaction of joining macromolecular chains through the formation of a heat stable three-dimensional network. The addition of a single accelerator or a mixture of accelerators and sulphur is sometimes required in order to ensure the simultaneity of the two reactions: the formation of macro radicals and the coupling reaction.

The macro radical formed has a specific life which depends on the type of peroxide used (the peroxide can be a mixture of peroxides that can lengthen the life of the macro radicals). In addition, the combinations of several types of accelerators significantly improve the speed of activation of sulphur. The working principle of this couple or crosslinking agents is to make all macro radicals react simultaneously with sulphur; as a result, the degree of crosslinking will be optimal for each formulation.

The optimization of the degree of crosslinking depends on the efficiency of the peroxide radical and sulphur speed of activation for a given transformation temperature in an extruder with specific characteristics and performances. The degree of crosslinking is based upon the concentration of the crosslinkable couple that, in turn, is based upon the mass ratio of the components (peroxide in relation to sulphur and the accelerator in relation to sulphur). Peroxide can be used in equal parts as well as in higher or lower percentage.

Several combinations have been successfully achieved up to a mass ratio of twice the sulphur mass (the peroxide used is DI (2-ter1-butylperoxydopropyl) benzene (s) (mixture of isomer 1.3 and 1.4 di (2-tertbutylperoxyisopropyl) benzene) in eva and the types of accelerators are: tetramethyl thiuram disulphide (tmtd) and tetramethyl thiuram monosulphide (tmtm)). The concentration of the accelerator may be the same as the sulphur concentration; however, 1/4 is usually the appropriate ratio, especially, when the extruder used for mixing is a traditional single-screw extruder with three stages (input, compression and homogenizing area). The higher the mass concentration of the crosslinkable couple, the higher the degree of crosslinking, and, therefore, the higher the screw torque.

In general, a parallel twin-screw with a high torque will generate a crosslinked polymer with a higher degree of crosslinking than that obtained by a single-screw extruder and the result is more significant when using a conical twin-screw. The preparation consists of a simple solid state mixture of polypropylene granules and powder providing an appropriate dispersion of the powder in the polymer granules. Usually, vegetable oil is added for a better fixation of the powder. The crosslinking operation has been performed for homopolymers, copolymers, polypropylene recycled or restored polymers as well as polypropylene mixed with various types of polyethylene.

The peroxides that can be used for this combination are: all types of peroxide with temperatures of decomposition over 100° C. and accelerators with activation temperatures over 140° C. In order to manufacture a crosslinked product, a compromise between the crosslinking time and the residence time in the extruder should be established.

The analysis of dynamic rheology using a plastograph facilitates the monitoring and control of the degree of crosslinking and the formation of interpenetrating networks such as incompatible mixes such as polypropylene and various types of polyethylene. Here is an example of formulation that was tested both for various types of polypropylene and polypropylene/polyethylene mix (50/50) in a plastograph room of 30 ml, at a temperature of 180° C. and a torque of 60 turns/min: the couple concentrations are as follows: peroxide 2%, sulphur 2% and TMDT 0.5% in the polymer mass used. The polymer mass is 28 grams, the maximum crosslinking time is 3 minutes at a torque over 1,600 Kgf.m.

What is claimed is:

1. A composition comprising:
   a. a polymer selected from the group consisting of (i) isotactic polypropylene homopolymer and (ii) isotactic polypropylene copolymer;
   b. sulphur;
   c. peroxide;
   d. an accelerator which is tetramethyl thiuram monosulphide (TMTM) or tetramethyl thiuram disulphide (TMTD);
   e. at least one additive.

2. The composition of claim 1, wherein the sulphur is selected from the group consisting of a sulphur atom S1, a polysulphide Sx, a sulphur cyclic compound.

3. The composition of claim 1, wherein the peroxide has a decomposition temperature greater than 100° C.

4. The composition of claim 1, wherein the accelerator has an activation temperature greater than 140° C.

5. The composition of claim 1, wherein the accelerator is present in a concentration ranging from a 1:4 mass ratio with the sulphur to a 1:1 mass ratio with the sulphur.

6. The composition of claim 1, wherein the additive is vegetable oil.

7. A composition comprising:
   a. a polymer blend selected from the group consisting of (i) isotactic polypropylene homopolymer and thermoplastic and (ii) isotactic polypropylene copolymer and thermoplastic;
   b. sulphur;
   c. peroxide;
   d. an accelerator which is tetramethyl thiuram monosulphide (TMTM) or tetramethyl thiuram disulphide (TMTD);
   e. at least one additive.

8. The composition of claim 7, wherein the thermoplastic is polyethylene.

9. The composition of claim 7, wherein the sulphur is selected from the group consisting of a sulphur atom S1, a polysulphide Sx, a sulphur cyclic compound.

10. The composition of claim 7, wherein the peroxide has a decomposition temperature greater than 100° C.

11. The composition of claim 7, wherein the accelerator has an activation temperature greater than 140° C.

12. The composition of claim 7, wherein the accelerator is present in a concentration ranging from a 1:4 mass ratio with the sulphur to a 1:1 mass ratio with the sulphur.

13. The composition of claim 7, wherein the additive is vegetable oil.

* * * * *